US005763692A

United States Patent [19]
Kierkus et al.

[11] Patent Number: 5,763,692
[45] Date of Patent: Jun. 9, 1998

[54] PROCESS FOR THE PREPARATION OF RECYCLATE POLYOLS HAVING A LOW AMINE CONTENT

[75] Inventors: Paul C. Kierkus, Gibraltar; Kimberly K. You, Westland, both of Mich.

[73] Assignee: BASF Corporation, Mt. Olive, N.J.

[21] Appl. No.: 739,226

[22] Filed: Oct. 28, 1996

[51] Int. Cl.$^6$ ............................. C07C 31/18; C07C 27/26
[52] U.S. Cl. ........................ 568/868; 568/852; 568/869; 568/871
[58] Field of Search ........................... 568/852, 868, 568/869, 871; 521/49, 49.5; 252/182.24

[56] References Cited

U.S. PATENT DOCUMENTS

| 5,300,530 | 4/1994 | Machado et al. |
| 5,357,006 | 10/1994 | Gassan et al. |
| 5,410,008 | 4/1995 | Bauer et al. |
| 5,508,312 | 4/1996 | Munzmay et al. |

FOREIGN PATENT DOCUMENTS

| 2114873 | 2/1994 | Canada |
| 4427250 | 2/1996 | Germany |

OTHER PUBLICATIONS

Organic Carbonates—Chem. Rev. 1996, 96, 951–976.

*Primary Examiner*—Gary Geist
*Assistant Examiner*—Karl J. Puttli, Jr.
*Attorney, Agent, or Firm*—Fernando A. Borrego

[57] ABSTRACT

A process for preparing a recyclate polyol obtained from glycolysis of polyurethanes and/or polyurea-polyurethanes comprises reacting scrap polyurethane and/or polyurea-polyurethane with a short-chain compound containing at least 2 OH groups in the presence of a catalyst and admixing a cyclic carbonate. The process results in a recyclate polyol having a low primary aromatic amine content which may be used to produce cellular or non-cellular polyurethanes, polyurea-polyurethanes, or polyisocyanurates.

22 Claims, No Drawings

PROCESS FOR THE PREPARATION OF RECYCLATE POLYOLS HAVING A LOW AMINE CONTENT

FIELD OF THE INVENTION

The present invention relates generally to a process for preparing polyols from recycled polyurethane and/or polyurea-polyurethane materials. The recyclate polyols are produced via glycolysis of the polyurethane and/or polyurea-polyurethane materials. The glycolysis reaction mixture is reacted with a cyclic carbonate to reduce the level of undesirable free amine component. The recyclate polyols may be used to produce cellular or non-cellular polyurethanes, polyurea-polyurethanes or polyisocyanurates.

BACKGROUND OF THE INVENTION

Interest in methods for recycling polyurethane and polyurea-polyurethane has been growing. One known chemical method, generally known as glycolysis, involves mixing polyurethanes and/or polyurea-polyurethanes with compounds containing at least two reactive OH groups. The mixture is reacted to produce a liquid product comprising a mixture of compounds containing OH groups, i.e., a recyclate polyol. The recyclate polyol can be employed alone or in combination with virgin polyols to prepare preferably rigid or semi-rigid polyurethane foams, polyurea-polyurethane foams or polyisocyanurate foams. The recyclate polyols may also be used in various polyurethane, polyurea-polyurethane and polyisocyanurate applications.

The glycolysis of polyurethane and polyurea-polyurethanes is well known in the art and has been described in various references. Such references include German Patent Applications DE 25 16 863 and DE 37 02 495, and U.S. Pat. Nos. 3,109,824; 3,404,103 and 4,014,809. H. Bruckner et al., Kunststoffe 81 (1991) 9, pages 751–759, describe the glycolysis of RIM polyurethanes and compare it with other methods of recycling polyurethanes and polyurea-polyurethanes. The various glycolysis methods known today differ in: the glycols, catalysts and reaction conditions employed. Generally, though, the depolymerization reaction mechanism is very similar throughout.

In known glycolytic processes, inherent reaction selectivity and water present in the glycols and the residual moisture in the polyurethane or polyurea-polyurethane leads to the formation of the parent amines of the isocyanates being recycled during the process. Aromatic amines, particularly primary aromatic amines (e.g., MDA and TDA), are suspected or regulated carcinogens and therefore create an undesirable hazard. Thus, it is desirable to substantially remove these amines from the recyclate polyols to ensure safe handling of the recyclate polyols. The amines also have an adverse effect in the polyurethane, polyurea-polyurethane or polyisocyanurate systems formulated from the recyclate polyols. These amines react with isocyanates to yield polyureas and also greatly accelerate the polyurethane formation reaction. These urea groups can impart undesirable physical properties and reduce the controllability of the polyurethane formation reaction by other catalysts.

One known method of removing the amines from the recyclate polyols includes treating the glycolysis batch with monomeric acrylic acid. The acrylic acid reacts with the amines and is incorporated into the recyclate polyol as described in U.S. Pat. No. 5,410,008. However, the resultant recyclate polyol has a high acid number which results in difficulties in using the recyclate polyol in a polyurethane system. Further, the acrylic acid exhibits a significant undesirable odor.

In another known process, described in U.S. Pat. No. 5,274,004, propylene oxide has been proposed as a deaminating agent for recyclate polyols. However, such process requires expensive pressure reactors to carry out the reaction with the propylene oxide. Further, propylene oxide forms explosive mixtures with air, thereby requiring control measures which are also expensive.

In yet another known method described in U.S. Pat. No. 5,357,006, monofunctional and/or difunctional glycidyl ethers are reacted with a recyclate polyol mixture to produce a recyclate polyol having a low amine content. Although this process has proven to be quite effective, the glycidyl ethers are expensive and may make it difficult to render the process economically feasible.

Thus, the known art has not successfully addressed the problems associated with economically and safely reducing the level of free amines in recyclate polyols. Accordingly, there remains a need for a cost-effective process for reducing or eliminating free amines in recyclate polyol products. Therefore, it is an object of the present invention to provide an inexpensive process for the glycolysis of polyurethane and/or polyurea-polyurethanes which provides a homogeneous recyclate polyol having a low-amine content suitable for further processing into polyurethane, polyurea-polyurethane or polyisocyanurate polymers.

SUMMARY OF THE INVENTION

The process of the present invention provides a recyclate polyol having a low amine content. The process comprises reacting polyurethanes and/or polyurea-polyurethanes with a short-chain compound containing at least two OH groups (hereinafter "short chain polyol compound") in the presence of a catalyst and admixing a cyclic carbonate.

Cyclic carbonates suitable in the process of the present invention include those having the general formula:

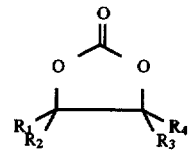

wherein each $R_1$, $R_2$, $R_3$ and $R_4$ is independently H, or a substituted or unsubstituted alkyl cyclo-alkyl or aryl or substituted aryl moiety having 1 to 8 carbon atoms. Particularly preferred cyclic carbonates include: ethylene carbonate, propylene carbonate and mixtures thereof.

In a preferred embodiment, the process for preparing a recyclate polyol of the present invention comprises mixing a short chain polyol compound with a catalyst, adding polyurethane and/or polyurea-polyurethane to the mixture of short chain polyol compound and catalyst, and admixing a cyclic carbonate into the mixture.

DETAILED DESCRIPTION OF THE INVENTION

The present invention provides a process for the preparation of recyclate polyols having a low amine content via glycolysis of polyurethanes and/or polyurea-polyurethanes. Generally, the process comprises the steps of reacting the polyurethanes and/or polyurea-polyurethanes with a short chain polyol component containing at least two reactive OH groups, e.g., a glycol, in the presence of an appropriate catalysts. The process further comprises admixing a cyclic carbonate into the reaction mixture, thereby minimizing the amine content in the recyclate polyol.

The basic glycolysis reaction is well known and essentially comprises reacting polyurethanes and/or polyurea-polyurethanes with a short chain polyol compound in the presence of a catalyst. The glycolysis reaction may take place at ambient pressure under an inert atmosphere, preferably of nitrogen gas. Under normal circumstances, the short chain polyol compound and catalyst are initially charged to the reactor prior to mixing in the polyurethane and/or polyurea-polyurethane which is to be recycled.

The short-chain polyol compounds usually contain 2 or 3 OH groups. Generally, the short chain polyol compound does not contain more than 20 carbon atoms. Particularly suitable compounds are ethylene glycol, oligoethylene glycols, propylene glycol, oligopropylene glycols, butanediols, neopentyl glycol, diethanolamine, methyldiethanolamine and triethanolamine. The short chain polyol compound may be used alone or as a mixture of one or more short chain polyol compounds.

Preferred short chain polyol compounds include: diethylene glycol, triethylene glycol, dipropylene glycol, tripropylene glycol and glycerol. The most preferred glycols are diethylene glycol, dipropylene glycol and mixtures thereof.

Known and conventional catalysts may be used in the process of the present invention and include alkali metal salts of short-chain fatty acids, titanates, stannates and antimonates. Preferred catalyst include: titanium (IV) butoxide, titanium (IV) isopropoxide, and titanium (IV) n-propoxide, titanium (IV) (2-ethyl)hexoxide. Each is commercially available from Aldrich Chemical Company.

The catalyst level usually in the reaction mixture is an effective catalytic amount of the particular catalyst used. Typical levels are from about 0.01% to 1.0% by weight of the polyurethane and/or polyurea-polyurethane and short chain polyol compound.

Generally, the cyclic carbonates useful herein include cyclic carbonates having the general formula:

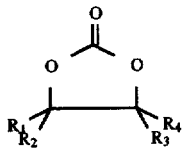

wherein each $R_1$, $R_2$, $R_3$ and $R_4$ is independently H, or a substituted or unsubstituted alkyl, cyclo-alkyl, aryl or substituted aryl moiety having 1 to 8 carbon atoms.

Cyclic carbonates suitable for use in the process of the present invention include 4-(chloromethyl)- 1,3-Dioxolan-2-one; 4-[(1 -propenyloxy)methyl]- 1,3-Dioxolan-2-one; 4-ethyl-1,3-Dioxolan-2-one; 4-ethenyl-1,3-Dioxolan-2-one; 4-chloro-1,3-Dioxolan-2-one; 4-(hydroxymethyl)-1,3-Dioxolan-2-one; 4,4,5,5-tetrachloro-1,3-Dioxolan-2-one; 4,4-dimethyl-1,3-Dioxolan-2-one; and 4,5-dichloro-1,3-Dioxolan-2-one; each of which is commercially available from Aldrich Chemical Company.

Cyclic carbonates which have proven particularly suitable in the process of the present invention include ethylene carbonate and propylene carbonate. Of these, ethylene carbonate or a mixture of ethylene carbonate and propylene carbonate, are particularly preferred. Ethylene carbonate and propylene carbonate are commercially available from Aldrich Chemical Company and Huntsman Chemical Company. The cyclic carbonate used in the process may comprise a single cyclic carbonate or a mixture of one or more cyclic carbonates.

Preferably, a reaction mixture of the polyurethane and/or polyurea-polyurethane, short-chain polyol compound and catalyst is initially prepared and then admixed with a cyclic carbonate. The mixing ratio between polyurethane and/or polyurea-polyurethane and the short chain polyol compound is highly dependent on the chemical structure of the polyurethane or polyurea-polyurethane employed, on the OH number of the short chain polyol compound employed, and the desired properties of the recyclate polyol. However, the ratio is usually from about 1:2 to 10:1, preferably from about 1.5:1 to 7:1, parts by weight of polyurethane or polyurea-polyurethane to short chain polyol compound.

The reaction temperature is preferably maintained between about 80° C. and 250° C., preferably between about 120° C. and 215° C. In a preferred process, the short chain polyol compound and catalyst are initially mixed and heated. The polyurethane and/or polyurea-polyurethane scrap is then mixed into the reaction mixture over a sufficient period of time to allow for essentially homogeneous mixing of the polyurethane and/or polyurea-polyurethane with the polyol compound and catalyst mixture.

The polyurethane and/or polyurea-polyurethane is allowed to react with the short chain polyol compound in the presence of the catalyst. The reaction time can generally be from less than 1 hour to about 10 hours. Preferably, the reaction time is from about 1 to 6 hours, most preferably from about 2 to 5 hours, depending on the physical and/or chemical properties of the polyurethane and/or polyurea-polyurethane scrap employed. Continuous mixing of the reaction mixture is preferably maintained throughout substantially the entire reaction time.

According to the current invention, the cyclic carbonate is usually added to the reaction mixture comprising the polyurethane and/or polyurea-polyurethane, short chain polyol compound and catalyst in an amount of from about 5 to 50%, preferably about 10% 2 0 to 40%, most preferably about 20% to 30% by weight of the polyurethane and/or polyurea-polyurethane scrap present in the reaction mixture. The weight ratio of polyurethane and/or polyurea-polyurethane to cyclic carbonate is preferably from about 20:1 to 2:1, depending primarily on the type of polyurethane and/or polyurea-polyurethane being recycled. Polyurethanes or polyurea polyurethanes with high MDI/TDI content will require higher ratios.

The cyclic carbonate is preferably admixed over substantially the entire reaction period. Most preferably, the cyclic carbonate is admixed at an essentially uniform rate over the entire reaction period. In a preferred embodiment, the cyclic carbonate is metered in at an essentially uniform rate across the entire reaction period.

After complete admixture of the cyclic carbonate, the entire reaction mixture is preferably maintained at the reaction temperatures described above and mixed for a sufficient period to allow the cyclic carbonate to fully react with the free amines present in the reaction mixture. The cyclic carbonate reacts with the primary aromatic amines or other free amines present in the reaction mixture, yielding principally oxyalkenylated aromatic amines, e.g., hydroxyethylenated or hydroxypropylenated derivatives of the amines, and carbon dioxide, thereby reducing the free primary aromatic amine content of the recyclate polyol. The derivatives remain as a component of the recyclate polyol and are eventually incorporated into the resulting polyurethane, polyurea-polyurethane or polyisocyanurate produced from the recyclate polyol. The recycling of polyurethane and/or polyurea-polyurethane scrap by the process of this invention creates little or no waste which would then itself require disposal.

In certain cases, e.g., where phase separation of the recyclate polyol produced with cyclic carbonates alone occurs, a relatively smaller amount of a glycidyl ether, preferably 2-ethylhexyl glycidyl ether, as described in U.S. Pat. No. 5,357,006, the disclosure of which is incorporated herein by reference, may be advantageously mixed with the cyclic carbonate prior to admixing with the reaction mixture. Alternately, glycidyl ether may be added as a separate stream directly into the reaction mixture, preferably after addition of the cyclic carbonate or mixture of cyclic carbonates is complete. When a glycidyl ether is used, the weight ratio of cyclic carbonate to glycidyl ether is at least about 4:1, preferably greater than about 15:1.

The following examples illustrate the invention. The examples are not intended to limit the scope of the invention in any respect. All percentages and ratios are by weight, unless otherwise indicated.

EXAMPLES

Scrap from standard polyurethane or polyurea-polyurethane processors is used in all the examples herein. The product used in the Examples is a non-cellular, polyurethane (MDI and polyether based) product. The scrap is precomminuted in a granulator and subjected to glycolysis without further treatment.

The glycol employed for the glycolysis is introduced into a reactor fitted with a mechanical stirrer, dropping funnel, thermometer and Dewar condenser and titanium (IV) butoxide catalyst is added. The glycol and catalyst mixture is then heated. The precomminuted polyurethane or polyurea-polyurethane is then added at a predetermined rate that allows the flask contents to remain stirrable and the temperature to remain constant. After complete addition of the scrap polyurethane or polyurea-polyurethane, the reaction mixture is maintained at the reaction temperature and, in Examples 1-4, the cyclic carbonate or cyclic carbonate mixture or cyclic carbonate and glycidyl ether mixture is admixed to the reaction mixture. When the reaction is complete, the product is cooled and discharged from the reactor.

The recyclate polyol is analyzed to determine the OH number, acid number, the viscosity at 25° C. (rotational viscometer) and the content of free amines (high-pressure liquid chromatography - HPLC).

COMPARATIVE EXAMPLE A

Diethylene glycol (150 g) and titanium (IV) butoxide (0.4 g) are added to a reaction vessel at room temperature under a slow sweep of nitrogen. The reaction mixture is agitated via the mechanical agitator and the temperature is brought to 205° C. Precomminuted polyurethane scrap (255 g) is added to the reaction mixture in a stepwise fashion in six identical portions. The temperature is held at 205° C. for 1 hours and then cooled to room temperature and discharged from the reactor. The analysis results are:

OH number (mg KOH/g): 510
Acid number (mg KOH/g): 0.83
Weight % 2,4-MDA: 0.05
Weight % 4,4'-MDA: 1.48
Viscosity at 25° C.: 40900 mPas

EXAMPLE 1

Diethylene glycol (3.1 kg) and titanium (IV) butoxide (8.1 g) are added to a pilot reaction vessel at room temperature under a slow sweep of nitrogen. The reaction mixture is agitated via the mechanical agitator and the temperature is brought to 205° C. Precomminuted polyurethane scrap (5.0 kg) is added to the reaction mixture in a stepwise fashion in six identical portions. The temperature is held at 205° C. for 2 hours. During these 2 hours, ethylene carbonate (1.5 kg) is added into the reaction mixture at a uniform rate. Gases evolved during the course of the reaction are vented. The reaction mixture is maintained at 205° C. for an additional 2 hours then cooled to room temperature and discharged from the reactor. The analysis results are:

OH number (mg KOH/g): 358
Acid number (mg KOH/g): 0.24
Weight % 2,4-MDA: <0.02
Weight % 4,4'-MDA: 0.13
Viscosity at 25° C.: 6620 mPas

EXAMPLE 2

Diethylene glycol (150 g) and titanium (IV) butoxide (0.4 g) are added to a reaction vessel at room temperature under a slow sweep of nitrogen. The reaction mixture is agitated via the mechanical agitator and the temperature is brought to 200° C. Precomminuted polyurethane scrap (255 g) is added to the hot glycol at such a rate that the reaction mixture remains stirrable and the reactor temperature remains constant. After the addition of polyurethane scrap, propylene carbonate (26 g) is metered into the reaction mixture at 200° C. at a uniform rate. The reaction mixture is stirred for 1 hour, then a 1:1 mixture of propylene/ethylene carbonate (51 g) is metered into the reaction mixture at a uniform rate. Gases evolved during the course of the reaction are vented. The reaction mixture is stirred for one additional hour and then 2-ethylhexyl glycidyl ether (5.0 g) is added all at once. The reaction mixture is maintained at 200° C. for a further 30 minutes then cooled to room temperature and discharged from the reactor. The analysis results are:

OH number (mg KOH/g): 416
Acid number (mg KOH/g): 0.14
Weight % 2,4-MDA: <0.02
Weight % 4,4'-MDA: <0.05
Viscosity at 25° C.: 2070 mPas

EXAMPLE 3

Diethylene glycol (110 g) and titanium (IV) butoxide (0.4 g) are added to a reaction vessel at room temperature under a slow sweep of nitrogen. The reaction mixture is agitated via the mechanical agitator and the temperature is brought to 205° C. Precomminuted polyurethane scrap (255 g) is added to the hot glycol mixture in a stepwise fashion in six identical portions. After the addition of polyurethane scrap, the reaction temperature is held at 205° C. for 2.5 hours. During these 2.5 hours, a 1:1 mixture of propylene carbonate/ethylene carbonate (77 g) is metered into the reaction mixture. Gases evolved during the course of the reaction are vented. The reaction mixture is maintained for 20 additional 3 hours at 205° C. then cooled to room temperature and discharged from the reactor. The analysis results are:

OH number (mg KOH/g): 382
Acid number (mg KOH/g): 0.19
Weight % 2,4-MDA: <0.02
Weight % 4,4'-MDA: <0.05
Viscosity at 25° C.: 3780 mPas

EXAMPLE 4

Dipropylene glycol (700 g) and titanium (IV) butoxide (1.0 g) are added to a reaction vessel at room temperature under a slow sweep of nitrogen. The reaction mixture is agitated via the mechanical agitator and the temperature is brought to 200° C. Precomminuted non-cellular polyurethane scrap (700 g) is added to the hot glycol mixture in a stepwise fashion in six identical portions. After the addition of polyurethane scrap, the reaction temperature is held at 200° C. for 1.5 hours. During this 1.5 hours, a 1:1 mixture of propylene carbonate/ethylene carbonate (105 g) is metered into the reaction mixture. Gases evolved during the course of the reaction are vented. After the reaction mixture had stirred at 200° C. for 2 hours, 2-ethylhexyglycidyl ether (35 g) was metered into the resultant mixture in 10 minutes. The reaction mixture was stirred for another 30 minutes before being cooled to room temperature.

OH number (mg KOH/g): 143

Acid number (mg KOH/g): 0.18

Weight % 2,4-MDA: 0.0089

Weight % 4,4'-MDA: 0.0021

Viscosity at 50° C.: 1170 mPas.

We claim:

1. A process for preparing a recyclate polyol comprising reacting polyurethanes and/or polyurea-polyurethanes with a short-chain compound containing at least 2 OH groups in the presence of a catalyst and admixing a cyclic carbonate.

2. A process for preparing a recyclate polyol as defined in claim 1, wherein the cyclic carbonate is selected from the group consisting of ethylene carbonate, propylene carbonate and mixtures thereof.

3. A process for preparing a recyclate polyol as defined in claim 1, wherein the cyclic carbonate is added in an amount of from about 5% to about 30% by weight of the polyurethanes and/or polyurea-polyurethanes.

4. A process for preparing a recyclate polyol as defined in claim 1, wherein the reaction temperature is maintained between about 80° C. to about 250° C.

5. A process for preparing a recyclate polyol as defined in claim 1, wherein the process comprises initially mixing the short chain compound and the catalyst and heating the mixture to a temperature between about 120° C. and 215° C., followed by adding the polyurethane and/or the polyurea-polyurethane.

6. A process for preparing a recyclate polyol as defined in claim 5, wherein the step of admixing the cyclic carbonate comprises metering in the cyclic carbonate over substantially the entire reaction period of the polyurethane and/or polyurea-polyurethane with the short chain compound.

7. A process for preparing a recyclate polyol as defined in claim 6, wherein the process comprises metering in the cyclic carbonate at an essentially uniform rate.

8. A process for preparing a recyclate polyol as defined in claim 1, wherein the short chain compound is selected from the group consisting of diethylene glycol, dipropylene glycol, triethylene glycol, tripropylene glycol, glycerol, and mixtures thereof.

9. A process for preparing a recyclate polyol as defined in claim 1, wherein the process comprises heating a mixture of the short chain compound and the catalyst to a temperature between about 120° C. and 215° C., adding the polyurethane and/or polyurea-polyurethane to the mixture, and then mixing the mixture for a reaction period of from about 2 to about 5 hours.

10. A process for preparing a recyclate polyol as defined in claim 1, wherein the process comprises mixing a glycidyl ether with the cyclic carbonate prior to the admixing step.

11. A process for preparing a recyclate polyol as defined in claim 1, wherein the process further comprises admixing a glycidyl ether.

12. A process for preparing a recyclate polyol comprising:
mixing a short-chain compound containing at least 2 OH groups and a catalyst;
reacting a polyurethane and/or polyurea-polyurethane with the mixture of short-chain compound and catalyst to form a recyclate polyol; and
admixing a cyclic carbonate to reduce the level of free primary aromatic amines in said recyclate polyol.

13. A process for preparing a recyclate polyol as defined in claim 12, wherein said cyclic carbonate is selected from the group consisting of ethylene carbonate, propylene carbonate and mixtures thereof.

14. A process for preparing a recyclate polyol as defined in claim 12, wherein the cyclic carbonate is added in an amount of from about 5% to about 30% by weight of the polyurethane and/or polyurea-polyurethane component.

15. A process for preparing a recyclate polyol as defined in claim 12, wherein the process further comprises heating the mixture and maintaining the reaction temperature between about 80° C. to about 250° C.

16. A process for preparing a recyclate polyol as defined in claim 12, wherein the process comprises initially mixing the short chain compound and the catalyst and heating to a temperature between about 120° C. and 215° C., adding the polyurethane and/or the polyurea-polyurethane, and metering in the cyclic carbonate.

17. A process for preparing a recyclate polyol as defined in claim 16, wherein the step of admixing the cyclic carbonate comprises metering in the cyclic carbonate over substantially the entire reaction period of the polyurethane and/or polyurea-polyurethane with the short chain compound.

18. A process for preparing a recyclate polyol as defined in claim 17, wherein the process comprises metering in the cyclic carbonate at an essentially uniform rate.

19. A process for preparing a recyclate polyol as defined in claim 12, wherein the short chain compound is selected from the group consisting of diethylene glycol, dipropylene glycol, triethylene glycol, tripropylene glycol, glycerol, and mixtures thereof.

20. A process for preparing a recyclate polyol as defined in claim 12, wherein the process comprises heating a mixture of the short chain compound and the catalyst to a temperature between about 180° C. and 215° C., adding the polyurethane and/or polyurea-polyurethane to the mixture, and then mixing the mixture for a reaction period of from about 2 to about 4 hours.

21. A process for preparing a recyclate polyol as defined in claim 12, wherein the process comprises mixing a glycidyl ether with the cyclic carbonate prior to the admixing step.

22. A process for preparing a recyclate polyol as defined in claim 12, wherein the process further comprises admixing a glycidyl ether to further reduce the level of free amines in said recyclate polyol.

* * * * *